W. L. & W. A. ROSS.
FENDER.
APPLICATION FILED FEB. 24, 1912.
1,056,586.
Patented Mar. 18, 1913.
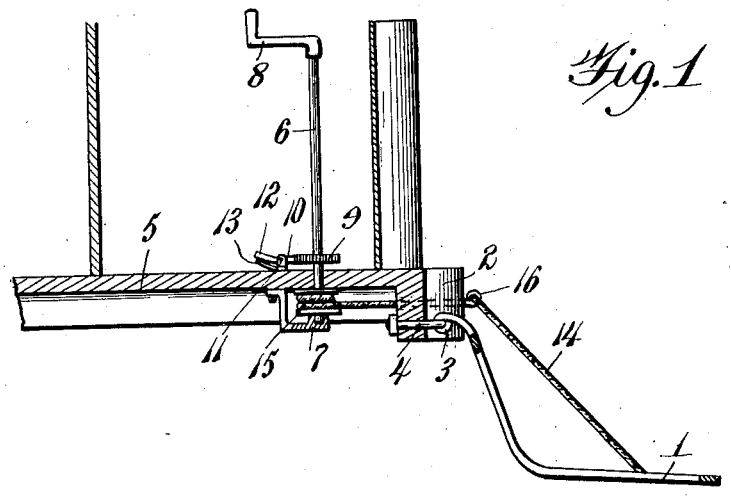
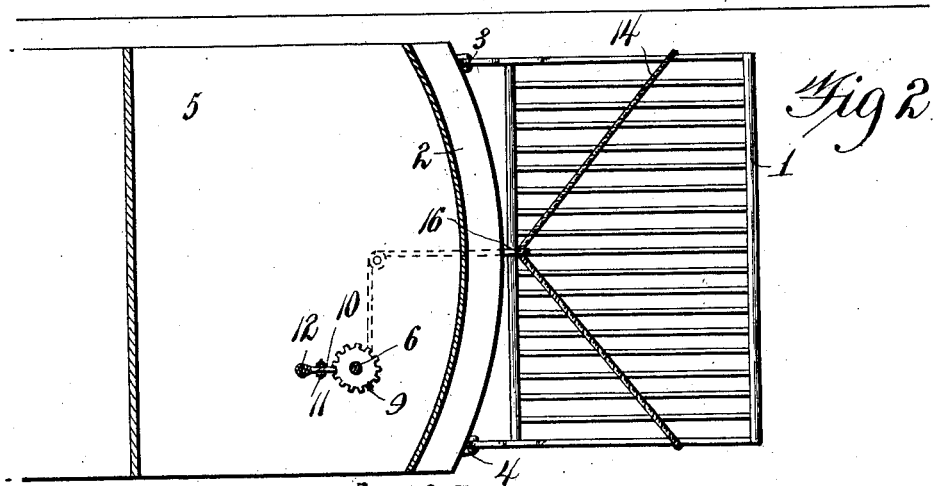
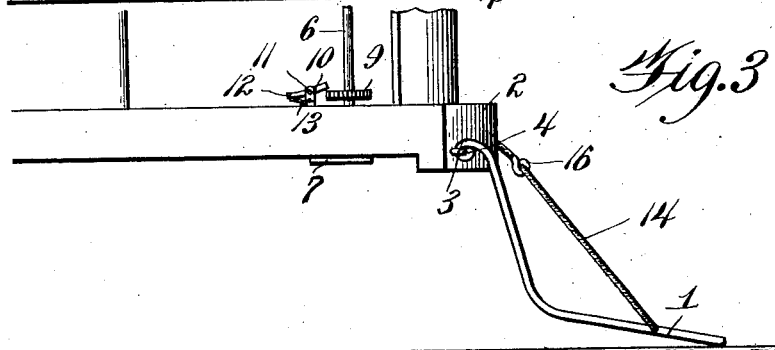
Witnesses
W. S. McDowell
K. Allen
Inventors
William L. Ross
Walter A. Ross
By Victor J. Evans
Attorney

UNITED STATES PATENT OFFICE.

WILLIAM L. ROSS AND WALTER A. ROSS, OF BELLAIRE, OHIO.

FENDER.

1,056,586.   Specification of Letters Patent.   Patented Mar. 18, 1913.

Application filed February 24, 1912. Serial No. 679,655.

*To all whom it may concern:*

Be it known that we, WILLIAM L. Ross and WALTER A. Ross, citizens of the United States, residing at Bellaire, in the county of Belmont and State of Ohio, have invented new and useful Improvements in Fenders, of which the following is a specification.

This invention relates to fenders for street cars and the like, and it has for its object to provide a simple and improved construction whereby the fender shall be normally supported at a suitable distance above the ground in such a manner that it may be readily and instantaneously dropped to slide on the ground in front of the car in the event of any person or obstruction appearing in front of the car, thus causing such person or obstruction to be surely engaged by and tilted into the fender in a manner to avoid serious injury.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a sectional elevation showing the improved fender applied to a car. Fig. 2 is a top plan view. Fig. 3 is a side elevation showing the fender lowered.

Corresponding parts in the several figures are denoted by like characters of reference.

The fender 1 which may be of any suitable approved construction is hingedly connected with a sill 2 of the car frame, preferably by means of hooks 3, associated with the fender and engaging eyes 4 which are associated with the sill.

The platform 5 has a vertical shaft 6 extending therethrough, and provided with a bearing 7 at a suitable distance beneath the platform whereby the said shaft is securely maintained in an upright position. The shaft 6 is provided at its upper end with an operating handle 8, and a short distance above the floor of the platform it carries a toothed wheel 9 which is engaged by a pawl or stop member 10, the latter being pivoted on a bracket 11 supported on the car platform. The pawl 10 also has a foot piece or treadle 12 whereby it may be moved to a non-engaging position with reference to the toothed wheel 9. A suitable spring 13 is also provided to engage the pawl 10 for the purpose of maintaining the latter normally in engaging position with reference to the toothed wheel 9. Suitably connected with the sides of the fender 1 are the ends of a flexible member 14 constituting a yoke or bail. A flexible member 15, one end of which is attached to and capable of being wound upon the shaft 6, is provided at its other end with a hook 16 engaging the bail 14.

It will be seen that by rotating the shaft 6 by means of the operating handle 8 while the pawl 10 is disengaged from the toothed wheel 9, the flexible element 15 may be wound upon the shaft, thereby lifting the fender to any desired elevation where it may be supported by placing the spring actuated pawl 10 in engagement with the toothed wheel 9. In the event of an obstruction being perceived upon the track the motorman by depressing the treadle 12 disengages the pawl 10 from the toothed wheel 9, thus permitting the fender to drop by gravity until it slides along the track in a position where it cannot fail to engage the obstruction which will thus be tilted into the fender without danger of serious injury. As soon as the car is brought to a stop or while it is in motion, the fender may be restored to an elevated position by rotating the shaft 6 to wind the element 15 thereon.

Having thus described the invention, what is claimed as new, is:—

The combination of a car frame having a sill and a platform, a bearing member on the underside of the platform, a vertical shaft extending through the platform and supported on the bearing member, said shaft having a toothed wheel above the floor of the platform and an operating handle at its upper end, a fender hinged on the sill, a flexible bail connected with the fender, a flexible member connected at one end with the bail and at the other end with the vertical shaft about which it may be wound, and a spring actuated pawl engaging the toothed wheel on the vertical shaft.

In testimony whereof we affix our signatures in presence of two witnesses.

WILLIAM L. ROSS.
WALTER A. ROSS.

Witnesses:
ALMAN LEIFFER,
DAVID D. DU BOIS.

Copies of this patent may be obtained for five cents each, by addressing the "Commissioner of Patents, Washington, D. C."